Dec. 9, 1952 R. C. BUEHL 2,621,234
INSTRUMENT FOR MEASURING THE CARBON CONTENT OF STEEL
Filed June 25, 1951
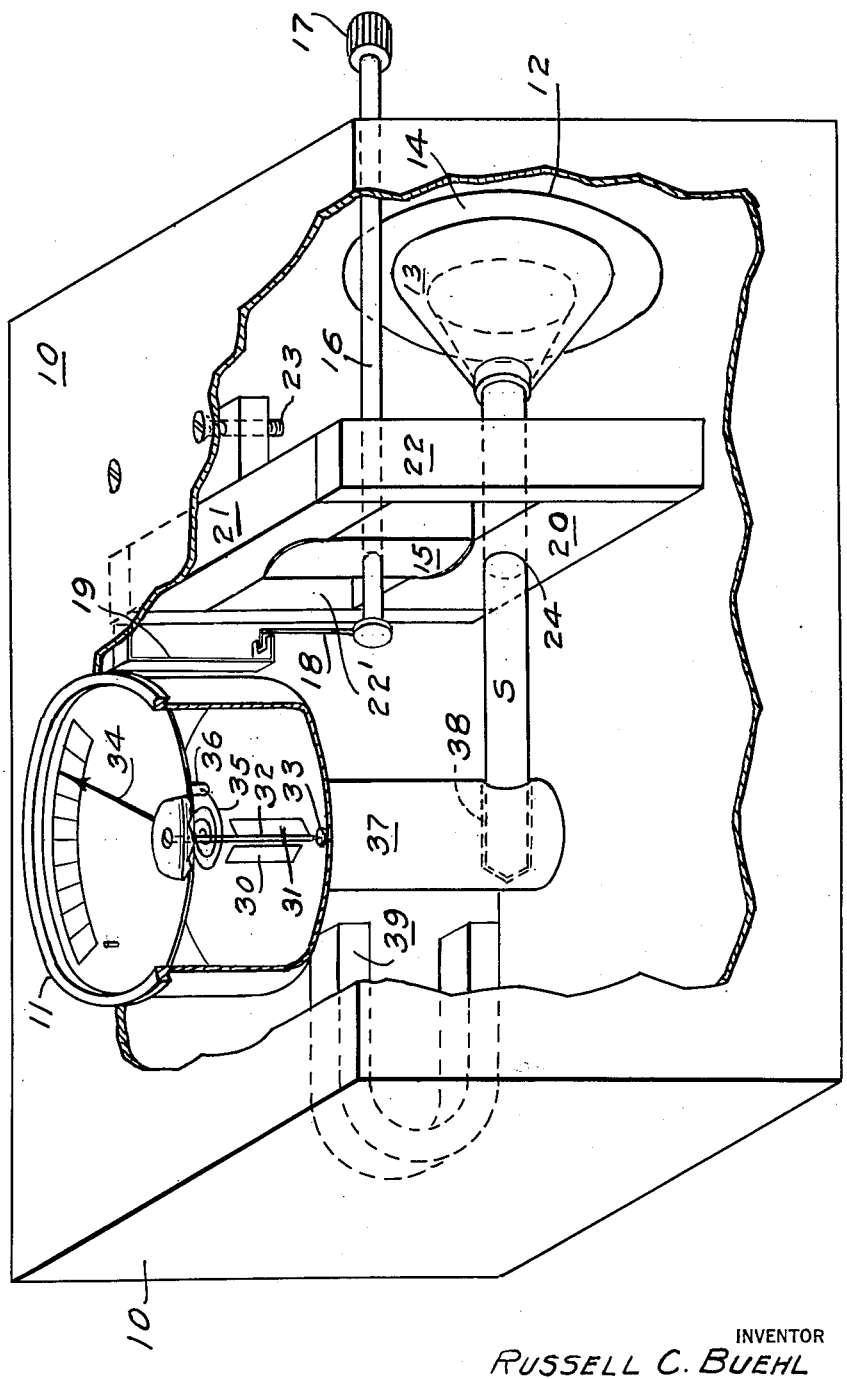
INVENTOR
RUSSELL C. BUEHL
BY
H. L. Godfrey
ATTORNEY Patented Dec. 9, 1952

2,621,234

UNITED STATES PATENT OFFICE 2,621,234

INSTRUMENT FOR MEASURING THE CARBON CONTENT OF STEEL

Russell C. Buehl, Pittsburgh, Pa., assignor to the United States of America as represented by the Solicitor of the Department of the Interior Application June 25, 1951, Serial No. 233,478

4 Claims. (Cl. 175—183)

(Granted under the act of March 3, 1883, as amended April 30, 1928; 370 O. G. 757)

The invention described herein may be manufactured and used by or for the Government of the United States for governmental purposes without the payment to me of any royalty thereon in accordance with the provisions of the Act of April 30, 1928 (Ch. 460, 45 Stat. L. 467).

This application relates to a device for measuring the magnetic properties of a sample of metal and more particularly to an instrument utilizing the magnetic properties of a steel sample to determine its carbon content.

In normal steel production, the steel is manufactured to close specifications for carbon content, for example, 0.10–0.20% carbon or 0.75–0.90% carbon. During the refining of steel, that is, when steel exists as liquid metal in open hearth or electric furnaces, the carbon content can change rapidly. The anlysis of samples of metals from the bath by chemical methods is often too slow, that is, the carbon content of the bath will change appreciably before the analysis can be completed. For this reason, instruments have been developed for estimating the carbon content of a bath by means of physical measurements on cast specimens, that is, measurement of magnetic properties or hardness.

Such instruments in the past have been expensive to construct and difficult to fabricate, calibrate, and utilize. These instruments usually contain a meter which must be interpreted by reading the maximum deflection of a swinging instrument pointer or by taking an average reading of an oscillating pointer. In addition, instruments in the past have required either batteries or an outside source of electrical power. The calibration of these instruments has been difficult and normally the calibration is seriously affected by changes in temperature and humidity.

An object of this invention is to provide an instrument for measuring the carbon content of steel which is cheaper to construct, more reliable and easier to use than present instruments.

A further object of the invention is to provide an instrument which gives a constant meter reading rather than requiring a reading from an oscillating meter pointer.

It is an additional object of the invention to provide an instrument which requires no batteries or outside connections to a source of electrical power.

Another object of the invention is to provide an instrument which may be easily calibrated and will retain constant calibration for a long period of time.

A particular object of the invention is to provide an instrument wherein the calibration depends upon the strength of two magnets and a coil spring and is not affected by changes in temperature and humidity.

Other objects and advantages will appear obvious from a careful consideration of a particular embodiment of the invention and of the drawing of this application wherein:

The figure is an isometric view, partially cut away, of an instrument embodying my invention.

In a particular embodiment of the invention, and referring now to the figure, there is shown a casing 10 which serves as the case containing the remainder of the instrument and also serves as part of the magnetic circuit of the instrument as will hereinafter be more particularly described. Case 10 is preferably made of steel, but any magnetic material may be used. This metal box 10 also serves to shield the instrument from the effects of extraneous magnetic fields or the presence of pieces of iron, such as tools, outside the instrument, the advisability of which is apparent from the opertaion of the device as hereinafter described.

Positioned in case 10 is a meter 11 which is supported with the meter face forming part of the surface of casing 10. The details of the meter will be described hereinafter. The casing 10 also contains an opening 12 in another wall thereof. This opening serves to allow the sample S to be tested to be inserted in the instrument. Positioned in the casing 10 and properly aligned with opening 12 is cone-shaped piece 13 preferably formed of magnetic material which serves to shield the meter from the magnetic properties of the head of a specimen S being tested as will more particularly be described hereinafter. Shield 13 is indirectly supported by casing 10 through a supporting member 14 which is formed of a non-magnetic material.

Positioned in the case 10 is an assembly for supporting a magnet 15 and for forming a part of a circuit for the magnetic flux of the magnet 15. This assembly comprises the magnet 15 itself which is mounted for rotation on a shaft 16, one end of which extends out through casing 10 and terminates in knob 17. The opposite end of the shaft 16 is provided with an arm 18 which cooperates with a flexible piece 19 which contains a slot wherein arm 18 may be positioned, to maintain the magnet 15 in a vertical position. The assembly also contains pole pieces 20 and 21 which are shown in the figure as being respectively below and above the magnet 15. These pole pieces 20 and 21 are preferably formed of soft iron and are supported in their respective positions by members 22 and 22' which are formed of a nonmagnetic, insulating material. A screw 23 is mounted on the upper pole piece 21. This screw may be adjusted to change the effective strength of magnet 15 by short circuiting a part of the magnet flux from magnet 15 to case 10. Lower pole piece 20 contains an opening 24 which opening is aligned with that in shield 13 and is used to support the sample S which is to be tested.

Meter 11, as shown in the figure, is composed of a stationary vane 30 which is formed of magnetic material, preferably soft iron, and a similar movable vane 31. Movable vane 31 is fixedly mounted on a shaft 32 which is supported in the meter by pivots such as 33. The pointer 34 of the meter is fixed to shaft 32. A coil spring 35 is also fixed to shaft 32 and to piece 36 which is attached to the meter face. The coil spring 35 serves to return the pointer 34 to a fixed position when no sample is being tested as will hereinafter be described.

Mounted below the meter 11 is a suitably shaped pole piece of magnetic material 37, preferably soft iron, in which is drilled a hole 38 into which the end of the sample S may be positioned.

As is obvious from a consideration of the figure, hole 38, hole 24 and the hole in shield 13 are all aligned in order to allow insertion of the sample S into the instrument. These holes are of a sufficient size to allow the insertion of the sample, but are kept to tolerances which minimize the clearance between the sample and the elements 37, 20, and 13 as much as practically possible.

A magnet 39 is also positioned in the case 10 and is positioned on the opposite side of pole piece 37 and meter 11 from magnet 15. This magnet 39 is used to compensate for the deflection of the meter due to magnet 15 when there is no sample S in the instrument.

The instrument of the invention as above described and as shown in the figure operates in the following manner. The permanent magnet 15 provides the constant magnetic field which serves for the deflection of the pointer 34 of meter 11 when the test sample S is inserted. The sample to be tested is normally cast from a current melt of steel and is usually quenched and then inserted into the instrument through shield 13, hole 24 and into hole 38 in pole piece 37. The sample as cast usually has a cone-shaped head portion due to the shape of the casting mold and shield 13 is formed in such a shape, as shown, in order to allow for this head portion.

The magnetic flux of magnet 15 follows a closed path and causes the meter to register. The flux follows a path from the magnet 15 through the soft iron pole piece 20, through sample S, through pole piece 37, across a small air gap, through vanes 30 and 31 in parallel, across a second air gap, through the metal case 10 and through pole piece 21 to the other end of magnet 15.

Assuming that magnet 15 has a north pole pointing downward, the vanes 30 and 31 would be magnetized with a north pole at the top and a south pole at the bottom. Since similar magnetic poles repel, the movable vane 31 will move away from the fixed vane 30 until the magnetic force is balanced by the restoring force of the spring 35, thus deflecting pointer F. It is obvious that this movement is directly related to the magnetic properties of the sample S, which is part of the close circuit for the flux.

In order to obtain a magnetic flux in the sample which is independent of possible previous retained magnetism in the sample, magnet 15 is rotated by means of shaft 16 so that the flux in the sample S is reversed several times prior to a reading. When steels are magnetized, they retain a certain amount of permanent magnetism and will not reach zero magnetism until a small magnetizing field is applied in the reverse direction (phenomenon called hysteresis). If an unmagnetized sample is magnetized then the magnetic field removed and reapplied, the magnetic flux in the sample will be slightly higher at the same field strength than during the first application of the field. However, if the field is reversed several times a value of magnetic flux is reached for a given field strength after which further reversals have no effect on the relation of magnetic flux to field strength. Consequently, the deflection of the meter would then depend only on the magnetic properties of the sample S and would be independent of whether it had been magnetized previously.

The nonmagnetic material of support 14 is used to prevent a magnetic short circuit of the magnet 15. If support 14 were not used, that is, if the casing 10 came in contact with shield 13, a large portion of the magnetic flux from magnet 15 would proceed through the pole piece 20, sample S, shield 13 then through the casing 10 to pole piece 21 and back to magnet 15. This would obviously reduce the magnetic field available for deflecting meter 11.

Compensating magnet 39 increases the accuracy of the meter by spreading the useful range of the meter by its action of compensating for the deflection of the meter due to magnet 15 when no sample is in the instrument. If magnet 39 is not present in the device, the meter will be deflected and the range of the meter will be from this point to the extent of the meter scale. When this compensating magnet is present, the meter will not be so deflected since the poles of the compensating magnet 39 are reversed to those of magnet 15, therefore decreasing the magnetic flux through the vanes 30 and 31. Obviously then, the range of the meter is greatly increased, and hence, the accuracy of the instrument is also increased.

The instrument is calibrated in the following manner: The position of the magnet 39 is so adjusted as to overcompensate the field of the magnet 15, that is, to produce some deflection on the instrument such as two divisions without any specimen (full-scale deflection is taken as ten divisions). A cast specimen is then inserted into the instrument and as the specimen approaches the piece 37 the pointer 34 will first move toward zero and then again move up scale. The position of the stationary end of the hair spring 35 is set by means of the meter adjustment screw so that this minimum reading will correspond with zero on the scale. A piece of low carbon steel which is used as a standard of calibration is next inserted in the instrument and the magnet 15 rotated several revolutions by means of the knob 17 to eliminate hysteresis in the calibration sample and other metal parts. Magnet 15 is then returned to its vertical position and held in place by the spring member 19. The meter reading is adjusted to some desired calibration reading by means of the screw 23. The cast specimen is then inserted into the instrument, magnet 15 rotated for several revolutions to eliminate hysteresis and then the meter reading taken with the magnet in its vertical position. The carbon content of the cast specimen is then determined by analysis and a calibration chart prepared showing the variation of carbon content with meter readings. By then following a similar procedure of casting, quenching, and reading, the carbon content of the steel bath can be determined from the meter reading on the instrument.

It should be appreciated that the shape of the calibration curve of carbon content versus meter reading can be varied by altering the size, shape and location of pole piece 37 and by changing the shape of vanes 30 and 31. The vanes can be made of triangular pieces of soft iron rolled into cylinders of different diameters with the movable cylinder inside the stationary cylinder. In addition, one of the vanes can be made of a hard, permanent magnet material so that it would not become demagnetized by the field of the other magnets.

It should be appreciated that the instrument of this invention has other uses than the determination of the carbon content in steel. Any variable characteristic of the sample which will alter its magnetic properties may be measured by this instrument. The device may, therefore, be used to determine some magnetic property of steel used as a magnetic material, to measure the depth of a hardened case on a steel bar, to determine the hardenability of steel, that is, the depth to which it will harden by quenching, and other uses which are obvious from a consideration of this application.

It will be appreciated from a reading of the foregoing specification that the invention herein described is susceptible of various changes and modifications without departing from the spirit and scope thereof. The invention is, therefore, to be limited only by the scope and spirit as set forth in the appended claims.

What is claimed is:

1. An instrument for measuring the magnetic properties of a sample of metal which comprises a steel case, a permanent magnet positioned vertically in said case, said magnet mounted on a rotatable shaft supported horizontally by said case, a plurality of soft iron pole pieces mounted respectively above and below said magnet and positioned by a plurality of supports formed of nonmagnetic insulating material, said lower pole piece having an opening therein wherein a portion of said sample to be tested may be positioned, a variable screw connecting said upper pole piece to said case, a meter mounted in and supported by said case, said meter comprising a fixed vane and a vane fixed to a shaft which is rotatable and has connected thereto a meter pointer, said vanes being formed of soft iron, a pole piece extending from the lower portion of said meter, said pole piece having an opening wherein an end of said sample may be positioned, an opening in said case through which said sample may be passed, said opening in said case and openings in said pole pieces being aligned to accommodate said sample, and a second magnet in said case positioned on the side of said meter opposite to said first magnet to thereby serve as a compensating magnet.

2. An instrument for measuring the magnetic properties of a sample of metal which comprises a case formed of magnetic material, a magnet mounted in said case, said magnet being mounted on a rotatable shaft supported by said case, a plurality of pole pieces formed of magnetic material mounted at the extremities of said magnet, an opening in one of said pole pieces, a meter mounted in said case, said meter comprising a fixed vane and a movable vane which is fixed to a meter pointer, said vanes being formed of magnetic material, a pole piece formed of magnetic material extending from said meter, an opening in said pole piece wherein an end of said sample may be positioned, an opening in said case through which said sample may be passed, said opening in said case, and said openings in said pole pieces being aligned to accommodate said sample, and a second magnet in said case positioned on the side of said meter opposite to said first magnet to thereby serve as a compensating magnet.

3. An instrument for measuring the magnetic properties of a sample of metal which comprises a case, a magnet mounted in said case, a pole piece mounted at an extremity of said magnet, an opening in said pole piece, a meter mounted in said case, said meter comprising a fixed vane and a movable vane which is fixed to a meter pointer, a pole piece extending from said meter, an opening in said pole piece, an opening in said case through which said sample may be passed, said opening in said case and said openings in said pole pieces being aligned to accommodate said sample, and a second magnet in said case positioned on the side of said meter opposite to said first magnet to compensate for said first magnet.

4. An instrument for measuring the magnetic properties of a sample of metal which comprises a case, a magnet mounted in said case, a pole piece mounted at an extremity of said magnet, an opening in said pole piece, a meter mounted in said case, said meter being operable to register magnetic flux, a pole piece extending from said meter, an opening in said pole piece, and an opening in said case through which said sample may be passed, said openings in said case and said pole pieces being aligned to accommodate said sample.

RUSSELL C. BUEHL.

REFERENCES CITED

The following references are of record in the file of this patent:

UNITED STATES PATENTS

| Number | Name | Date |
|---|---|---|
| 508,827 | Knap et al. | Nov. 14, 1893 |
| 1,682,435 | Spooner | Aug. 28, 1928 |
| 2,384,529 | Breitenstein | Sept. 11, 1945 |